United States Patent [19]

Manico

[11] Patent Number: 5,259,504
[45] Date of Patent: Nov. 9, 1993

[54] PROOF PRINT-FILM NEGATIVE STORAGE PACKAGE

[75] Inventor: Joseph A. Manico, Rochester, N.Y.

[73] Assignee: Eastman Kodak Company, Rochester, N.Y.

[21] Appl. No.: 818,954

[22] Filed: Jan. 10, 1992

[51] Int. Cl.$^5$ .................. B65D 73/00; B65D 75/38
[52] U.S. Cl. .................... 206/455; 206/459.5
[58] Field of Search ............ 206/455, 456, 459.5

[56] References Cited

U.S. PATENT DOCUMENTS

| | | | |
|---|---|---|---|
| 897,679 | 9/1908 | Thompson | 206/455 |
| 1,887,502 | 11/1932 | Epstein . | |
| 3,136,679 | 6/1964 | Bender | 206/455 X |
| 3,291,178 | 12/1966 | Elliff | 150/39 |
| 3,334,677 | 8/1967 | Toomey | 150/34 |
| 3,428,104 | 2/1969 | Ary | 150/28 |
| 4,720,733 | 1/1988 | Ohtake et al. | 355/50 |
| 4,966,285 | 10/1990 | Otake et al. | 206/455 |
| 4,997,089 | 3/1991 | Ozeki | 206/455 |
| 5,031,773 | 7/1991 | Manico et al. | 206/455 |

FOREIGN PATENT DOCUMENTS 206205 10/1939 Switzerland .................. 206/455

Primary Examiner—William I. Price
Attorney, Agent, or Firm—D. Peter Hochberg; Mark Kusner

[57] ABSTRACT

A package for containing strips of photographic film negatives comprises a cover member having positive images reproduced on its cover of the contained negatives. The cover is folded to form front and rear panels, the lower portion of the rear panel also being folded to form a front-facing flap. The lower edge of the front panel is insertable between the flap and the adjacent portion of the rear panel to secure the package in a closed configuration, similar to a book of safety matches. A sheet of longitudinal, hollow sleeves, connected at their lateral edges and fastened to the cover's inner surface between the flap and the lower portion of the rear panel, for holding the film strips.

2 Claims, 2 Drawing Sheets

PROOF PRINT-FILM NEGATIVE STORAGE PACKAGE

TECHNICAL FIELD

This invention relates to storage packages for photographic film negatives. More particularly, this invention relates to a storage package for photographic film negatives that also serves as an index print record of the negatives contained therein. Specifically, this invention relates to a storage package for photographic film negatives whose cover is a proof print of the negative. The package has a structural configuration similar to that of a book of safety matches, in which however, sleeved negatives, rather than matches are contained.

BACKGROUND ART

Those involved in photography, either as a hobby, or on a professional basis, are confronted with the need to store strips of film negatives in a manner in which negatives of interest can be retrieved from storage, for example, to obtain further prints therefrom.

Many photographers have their exposed film commercially developed, the film being returned by the processors thereof in the form of strips of film negatives, each strip containing a number of exposures thereon. Depending on the processor, these film strips are sometimes packaged in sheets of transparent sleeves, each sheet comprising multiple sleeves, connected in side-by-side relationship. In other instances, however, the developed film is simply returned in the form of loose strips of negatives packaged in an envelope. The latter form is particularly undesirable since the negatives are vulnerable to scratching, the occurrence of which makes its difficult if not impossible to obtain additional acceptable prints therefrom. Furthermore, in both cases, the negatives are accompanied only by the prints made from the negatives, and when these are removed from the package, the subject matter of the negatives can only be ascertained by the laborious process of individual examination of the negatives.

In instances where the individual concern has no interest in the pictures other than the prints initially received from the processor, or where the negatives which the individual wishes to retain are minimal, retrieval of a desired picture by examination of the negatives is a relatively simple task. Where, however, the individual is extensively engaged in photography and desires to retain relatively large numbers of negatives for possible further reference, or further prints, the identification of a particular picture from a large negative archive through individual examination of the negatives becomes arduous to the point of being impractical.

In attempts to overcome the difficulty described, it has been suggested that the sleeved picture negatives be packaged together with a proof print, thereby facilitating identification of the pictures associated with the negatives. While such a system has the merit of making negative retrieval simply a matter of scanning the proof print, it is not without practical difficulties.

For instance, a 4"×6" proof print is conveniently sized both from the standpoint of handling and storage, as well as viewing; however, a film package of that size is limited in its capacity to accommodate negatives associated therewith, for example, those laminated to the back of the proof print, a convenient type of storage package. In this regard, a package of such dimensions is, for instance, adapted to store only two strips of 35 mm film having four image frames on each strip. Ordinarily, however, the unexposed film comes in rolls containing a minimum of twenty-four, occasionally twenty-eight exposures. Consequently, packages of the size mentioned, are incapable of holding all of the negatives contained on such rolls.

While a larger proof print, for instance, one measuring 6"×8.5" could have 28 pictures, printed thereon, the larger format is much less convenient to store and handle than the 4"×6" package, and furthermore, such a format would still be too small to hold seven strips of sleeved negatives laminated to the rear surface of the proof print.

SUMMARY OF THE INVENTION

In view of the preceding, therefore, it is a first object of this invention to provide an improved package for storing photographic film negatives.

A second object of this invention is to provide a package for storing photographic film negatives that facilitates the retrieval of particular pictures from a number of such packages.

It is an additional object of this invention to provide an improved package for storing photographic film negatives in association with a proof print thereof.

It is yet another object of this invention to provide a storage package for photographic film negatives that holds the negatives in protective sleeves on the interior of the package.

Yet a further object of the invention is to provide a storage package for photographic film negatives in which the positive images corresponding to the images contained on the negative are printed on the package cover.

A still additional object of the invention is to provide a package containing photographic film negatives protected by a cover folded to form front and back panels, the free ends of which are securable together by means of a latching structure formed in conjunction with an overlapping flap located on one of the ends, which is used to secure the other end.

Still yet a further object of the invention is to provide a package configured in a form similar to that of a book of safety matches, however, having sleeved photographic film negatives, rather than matches attached to the interior thereof.

The foregoing and other objects are provided in a preferred embodiment of the invention by a package for storing photographic negatives. The package comprises a cover member folded to form front and rear panels, the lower portion of the rear panel being further folded to form a front-facing flap. The lower edge of the front panel is insertable between the lower portion of the rear panel, and the flap, to secure the package, in a way similar to that in which a book of safety matches is closed. The cover member has reproduced thereon positive counterparts of the images on the negatives. A sheet of interconnected sleeves designed to receive strips of photographic film negatives is fastened to the cover member on the interior of the package. The sheet is foldable within the package, thereby providing protection for the film.

BRIEF DESCRIPTION OF THE DRAWINGS

The invention will be better understood when reference is had to the attached drawings, in which like-numbers refer to like-parts, and in which.

BEST MODE FOR CARRYING OUT THE INVENTION

Figure 1:
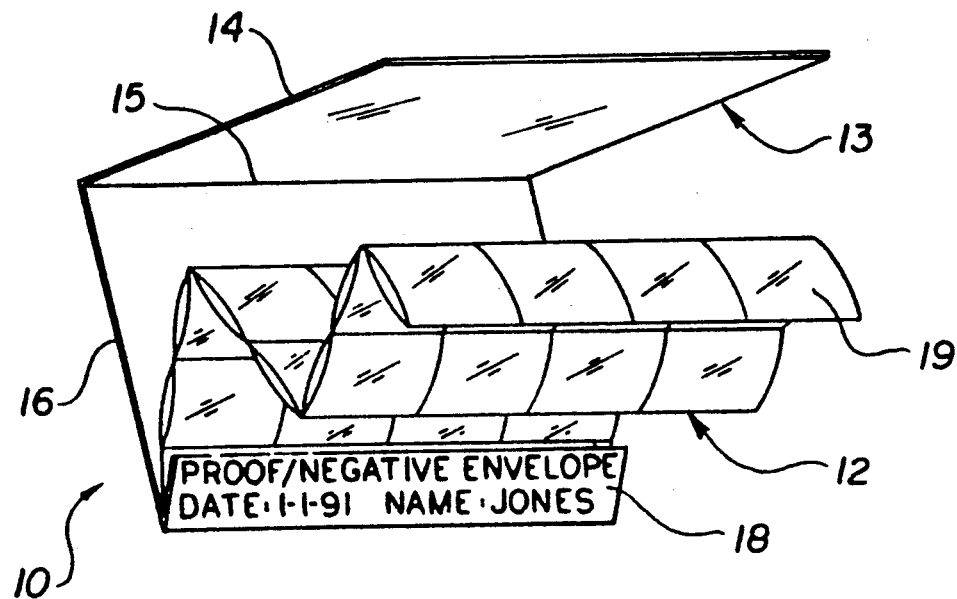
FIG. 1 is an isometric view of a storage package of the invention in its open position.

As shown in the drawings, especially FIG. 1, a cover, generally 13, is folded about fold line 15 to provide a front panel 14 and a rear panel 16. The cover 13 is further folded about fold line 17 forming a locking flap 18. The lower end of a sheet of sleeves 12, adapted to receive photographic film negatives, is attached at its lower end between flap 18, and the lower portion of rear panel 16.

As can be seen in the Figure, sheet 12 comprises a series of sleeves 19, connected at their lateral edges. The sheet 12 is adapted for holding within the interior of the package 10 when the latter is in its closed position, as better seen in FIG. 3. While sleeves 19 may be folded within the package in a variety of ways, a convenient method is that shown, in which the sheet is folded to form panels of two sleeves each, with the exception of the last, upper most sleeve, which consists of one panel.

Cover 13 may be formed from any of a variety of materials, however, paper is well suited for purposes of the invention. In a preferred embodiment of the invention, both sides of the cover, or lesser portions thereof, can be coated with a film of plastic material, particularly thermoplastic material, for example, polyethylene.

Figure 2:
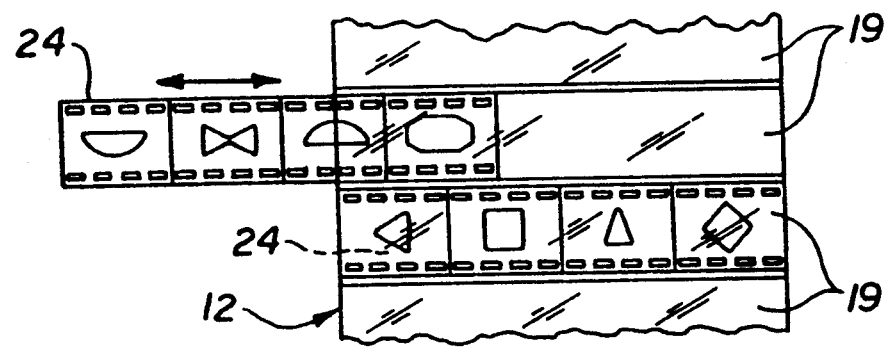
FIG. 2 is a partial view of a sheet of connected sleeves with film strips therein of the type used in packages of the invention.

FIG. 2 is a partial view of a sheet of connected sleeves 12 with film strips therein of the type used in conjunction with packages of the invention. As illustrated, sleeves 19 are connected at their lateral edges and dimensioned to receive a strip of film negatives 24 therein, which may be inserted or removed in the direction of the associated arrow.

While the package of the preferred embodiment of the invention, including the sheets of connected sleeves associated therewith may be otherwise configured, in a preferred embodiment of the invention, the sleeves making up the sheets will be dimensioned to receive strips of 35 mm film negatives, having four exposure frames to a strip. Advantageously, such sheets will contain seven such sleeves, thereby, accommodating negatives from both 24 and 28 exposure rolls of film.

Again, while the package of the invention may be otherwise dimensioned, with packages configured as described, the sleeves will desirably accommodate strips of photographic film negatives about 6" long and about 1-⅜" wide.

Although other materials may be employed to form the sheets, the use of plastic materials is desirable, and among such materials thermoplastics are preferred, for example, polyethylene or others. The use of transparent or translucent materials is also preferred, those providing transparency being especially preferred since they accommodate visual inspection of the film strips contained therein.

Figure 3:
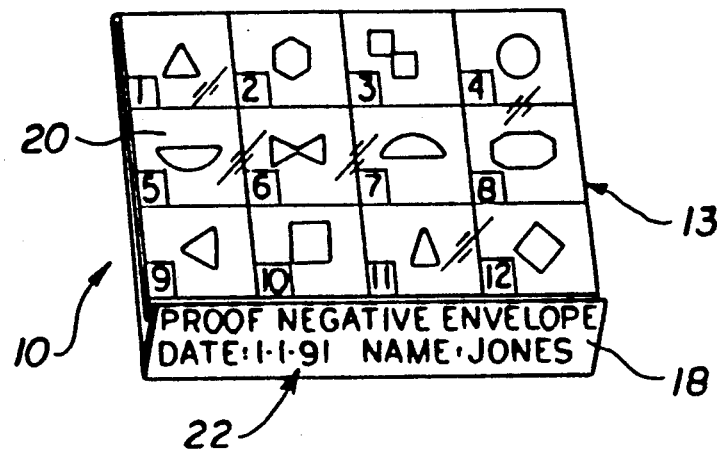
FIG. 3 is an isometric view of a storage package of the invention in its closed position, and having positive images corresponding to the negatives contained therein reproduced on the outside thereof.

FIG. 3 is an isometric view of a storage package of the invention in its closed position, and having positive images corresponding to the negatives contained therein reproduced on the outside thereof. The Figure illustrates the keeper or storage package 10, generally, in its closed position, and shows a cover 13 in the form of a proof print 20. If desired, identifying text or advertising can be displayed, for example, on the flap 18.

While positive images are shown on the outside of the package illustrated in the Figure, if desired, such images may alternatively be reproduced on the inside of the package. Furthermore, as an alternative to positive images, the cover can simply be provided with space for a written description of the contents of the package, or with advertising. However, the display of an index in the form of a proof print is preferred.

The indexing or proof print may take the form of a contact print, or alternatively, a print produced by digital means. Where digital reproduction is to be employed, thermal, optical, or other similar techniques known to the art will provide satisfactory results.

Figure 4:
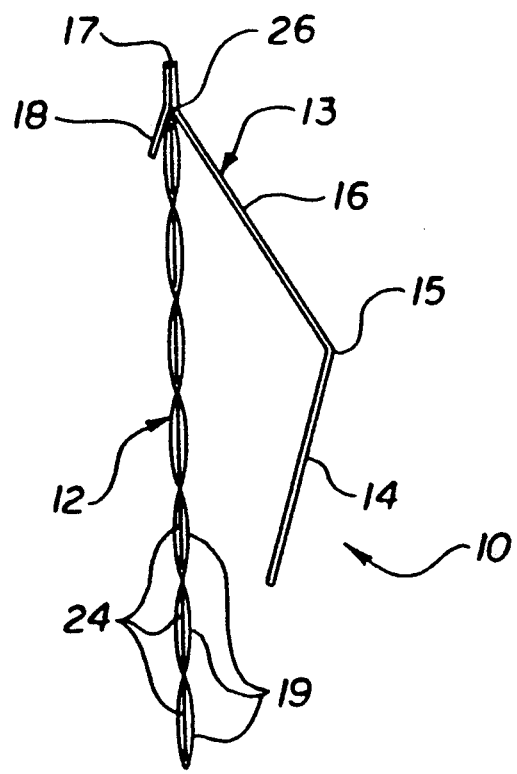
FIG. 4 is an side view of a package of the invention with a sheet of connected sleeves containing film strips attached thereto.

As shown in FIG. 4, cover 13 is folded at fold line 15 to form front and rear panels 14 and 16, respectively, and further folded at fold line 17 to form the front facing flap 18. Sheet 12, in which negative film strips 24 are located, includes connected sleeves 19 fastened at a point of attachment 26 between the flap 18, and an adjacent portion of the inner surface of rear panel 16, the adjacent portion being the lower portion of the panel in its normal orientation, as better seen in FIGS. 1 and 3. Sleeves 19 are generally flat sheets of opposed material and open at both ends, from which film strips 24 can be inserted or removed.

While the dimensions of the package can be varied to accommodate whatever film is to be stored, in connection with packages having the dimensions previously referred to, it is convenient to make the package from rectangular proof sheets measuring about 8-½"×6". Such a proof sheet can be folded to provide a package about 6" wide and 4" high, a convenient size. In addition to being 6" wide, such a package will have a front panel of about 3-⅜" high, a back panel of about 4" high, and will have a flap about 1" high.

Attachment of the sheet 12 can be by means of an adhesive, stapling, or heat fusing. Heat fusing is particularly useful where the sheet is made of a thermoplastic material, and at least the interior of flap 18 and the surface of panel 13 adjacent thereto, are also coated with a film of thermoplastic material, for example polyethylene.

While in accordance with the patent statutes, a preferred embodiment and best mode has been presented, the scope of the invention is not limited thereto, but rather is measured by the scope of the attached claims.

I claim:

1. A package for storing photographic film negatives, said package comprising:
   a cover member having overlapping front and rear panels, each panel having lower and upper portions and being attached to each other at a fold line at their upper portions;
   a plurality of interconnected sleeves for receiving strips of image-containing photographic film negatives, said sleeves forming a sheet located in said cover member between said front and rear panels; and positive counterpart images on said cover member of the negative images contained on the strips of film negatives in said sleeves in which said positive counterpart images are reproduced on the exterior of said front and rear panels.

2. A package containing photographic film negatives comprising:

a cover member folded to form front and rear panels, each panel having lower portions unconnected to the other panel, a lower portion of said rear panel being further folded towards the front panel to form a front flap, the lower portion of said front panel being insertable between the lower portion of said rear panel and said flap to close said package, said cover member having reproduced thereon positive counterparts of the images contained on said negatives;

a plurality of interconnected sleeves forming a sheet adapted to contain strips of photographic negatives and being foldable for containment between said panels; and connecting means for connecting a portion of said sheet of sleeves between the front and rear panels to locate said sheet in said cover member.

* * * * *